June 8, 1926.

W. C. HEDGCOCK

BRAKE SLACK ADJUSTER

Filed Nov. 28, 1924

1,587,522

Witness:
R. Burkhardt

Inventor:
William C. Hedgcock,
By Wilkinson, Huxley, Byron & Knight
Attys.

Patented June 8, 1926.

1,587,522

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

BRAKE-SLACK ADJUSTER.

Application filed November 28, 1924. Serial No. 752,536.

This invention relates to a brake slack adjuster whereby slack in the brake rigging may be taken up as the brake shoes become worn.

One object of the invention is to provide a simple, efficient and durable brake slack adjuster, which includes means for protecting the threaded members against dirt, dust and the like.

Another object is to provide a brake slack adjuster in which the various parts cooperate in an improved manner to meet the various requirements under operating conditions.

Figure 1:
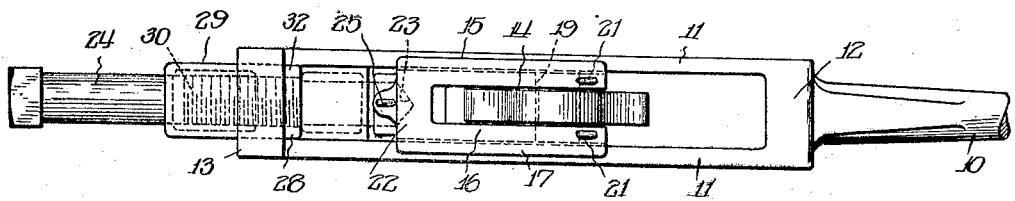
Figure 2:
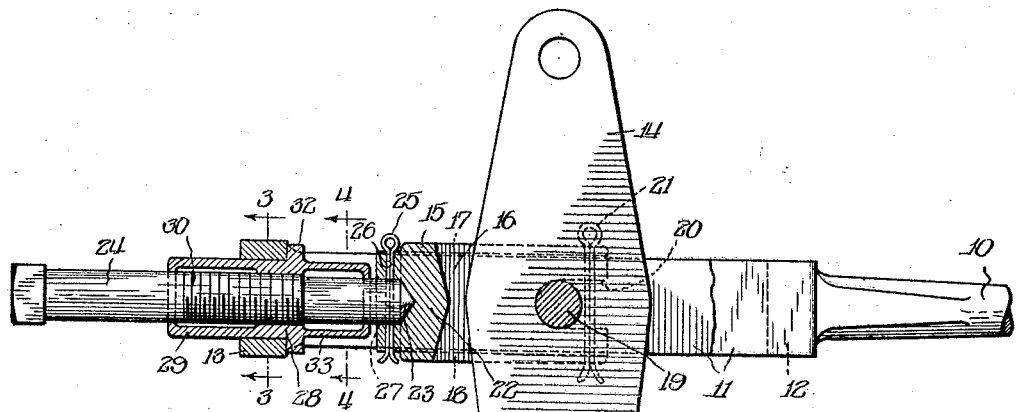
Figure 3:
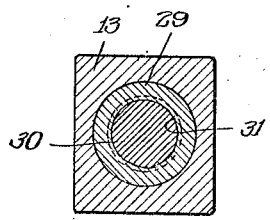
Figure 4:
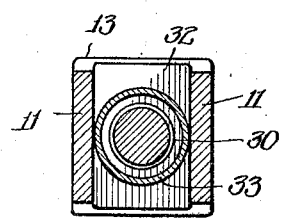

These, and other objects are accomplished by means of the arrangement shown on the accompanying sheet of drawings in which;

Figure 1 is a fragmentary top plan view of brake mechanism embodying my invention;

Figure 2 is a side elevation of the same, parts being in section for the sake of clearness; and, Figures 3 and 4 are sectional views respectively taken in the planes of lines 3—3 and 4—4 of Figure 2.

The various novel features of the invention will be apparent from the following description and drawings and will be particularly pointed out in the appended claims.

Referring to the figures of the drawings, it will be noted that the improved slack adjuster is associated with a brake rod 10 having at one of its ends a frame including side walls 11 and two ends walls 12 and 13 which form a closure for an opening in which an associated brake lever 14 is received and is movably mounted. Slidably mounted on the side walls 11 of the frame is a U-shaped fulcrum block 15 having legs 16 with upper and lower flanges 17 and 18 for guidedly engaging the upper and lower surfaces respectively of the side walls 11 of the frame. The brake lever 14 is received within the space between the legs 16 of the fulcrum block and is pivotally connected to the latter by a pin 19 which is received within slots 20 in the legs 16 and retained in position by any suitable keeper members such as cotter pins 21. The cross piece 22 connecting the legs 16 of fulcrum block has a recess 23 into which one end of the adjusting screw 24 of the slack adjuster extends, and said screw normally is secured to the cross piece 22 of the fulcrum block by a cotter pin 25 passing through registering openings 26 and 27 in the fulcrum block and screw 24 respectively.

For cooperating with the screw 24 in adjusting the brake lever 14 to take up the slack, a nut 28 is provided. This nut has a barrel portion 29 for housing the threaded portion 30 of the screw 24 when said screw occupies one limit of its movement and has another oppositely extending barrel portion 33 for housing the threaded portion 30 of the screw when it is at its other limit of movement, it being understood that both barrel portions 29 and 30 protect the said threaded portion at all times. The first barrel portion 29 of the nut 28 extends through a circular opening 31 in the end wall 13 of the frame and by means of an intermediate squared portion 32 of the nut, which fits snugly between the side walls 11 of the frame, said nut is stationarily held with respect to the frame. Said squared portion 32 also acts as a thrust bearing acting against the end wall 13 of the frame as the screw 24 is progressively fed through the nut 28. It will be understood that when it is desired to adjust the fulcrum block 15 and accordingly, the brake lever 14 to rectify slack conditions, the cotter pin 25 will be withdrawn from the screw 24, said cotter pin being replaced in its normal position after the desired adjustment has been made.

By means of this mechanism, the required adjustments for rectifying slack conditions may be easily and quickly made and at the same time the thread of the screw will be protected against foreign material so that the adjustments may be greatly facilitated.

I claim—

1. In a brake slack adjuster, the combination of a frame having side walls and end walls, one of said end walls having an opening therein, a fulcrum block slidably carried by said side walls, a nut having a portion engaging said side walls to hold said nut stationary, said nut also having a housing portion extending through the opening in said end wall, and a screw cooperating with said nut for adjusting said fulcrum block and being mounted within the housing for protection.

2. In a brake slack adjuster, the combination of a frame having side walls and end walls, one of said end walls having an opening therein, a fulcrum block slidably carried by said side walls, a nut having a portion engaging said side walls to hold said nut stationary, said nut also having a housing portion extending through the opening in said end wall, a screw cooperating with said nut for adjusting said fulcrum block and being mounted within the housing for protection, and means for releasably connecting said fulcrum block and screw.

3. In a brake slack adjuster, the combination of a frame, a fulcrum block movably carried thereby, a nut having an intermediate portion for engaging said frame to prevent relative movement between said nut and frame, said nut having housing portions extending oppositely from said intermediate portion, and a screw cooperating with said nut for adjusting said fulcrum block and being mounted within said housing portions for protection.

Signed at Chicago, Illinois, this 22nd day of November, 1924.

WILLIAM C. HEDGCOCK.